No. 738,263. PATENTED SEPT. 8, 1903.
J. G. WAGGONER.
NUT LOCK.
APPLICATION FILED APR. 13, 1903.
NO MODEL.

Witnesses
Adelaide Kearns
J A Walsh

Inventor
James G. Waggoner
By
Bradford Hood
Attorneys

No. 738,263. Patented September 8, 1903.

UNITED STATES PATENT OFFICE.

JAMES G. WAGGONER, OF JONESVILLE, INDIANA, ASSIGNOR OF ONE-HALF TO CHARLES H. HUBBARD, OF JONESVILLE, INDIANA.

NUT-LOCK.

SPECIFICATION forming part of Letters Patent No. 738,263, dated September 8, 1903.

Application filed April 13, 1903. Serial No. 152,431. (No model.)

*To all whom it may concern:*

Be it known that I, JAMES G. WAGGONER, a citizen of the United States, residing at Jonesville, in the county of Bartholomew and State of Indiana, have invented certain new and useful Improvements in Nut-Locks, of which the following is a specification.

The object of my invention is to produce a neat and efficient nut-lock which may be manufactured at a low cost and which in its use will not mutilate either the bolt or nut in connection with which it is to be used and which may be used in connection with bolts and nuts not especially prepared at the factory for such use.

The accompanying drawings illustrate my invention.

Figure 1:
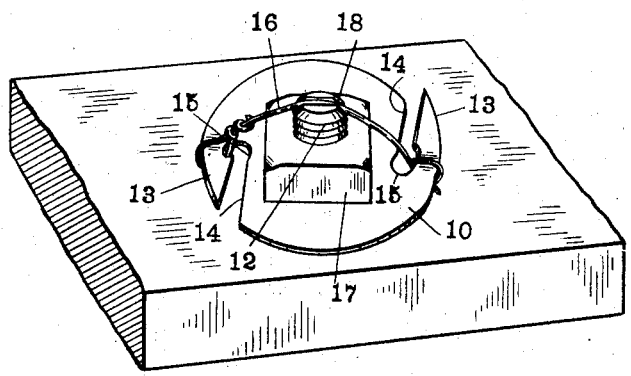
Figure 2:
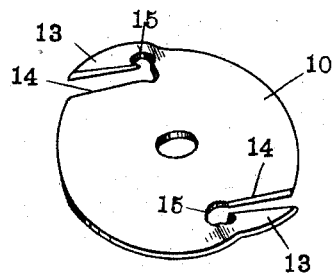

Figure 1 is a perspective view of my invention in use. Fig. 2 is a perspective view of the washer.

In the drawings, 10 indicates a washer or annulus having a central hole through which the bolt 12 may pass. Washer 10 is provided with a pair of diametrically-opposed prongs 13 13, which are formed by slitting or slotting the body of the washer at 14 and raising the prongs from the plane of the washer. A recess or enlargement 15 is formed at the inner end of each slit for a purpose which will appear. The washer thus made will be placed upon the market in standard sizes, and in use one end of a wire 16 will be attached to one prong, as shown. This wire 16 may be attached to each washer at the factory, and thus form a part of the article of commerce, or, if desired, the washer alone may be put upon the market and the operator attach the short sections of wire when needed.

In use the washer is placed over a bolt, and the nut 17 then screwed to position, and wire 16 then passed diametrically across the end of the bolt and fastened around the base of the opposing prong 13, a diametrical kerf or groove 18 having been first formed in the bolt 12, the depth of said groove being such that when the wire is in the position as shown in Fig. 1 the portions thereof upon opposite sides of the bolt will form a bridge beneath which the corners of the nut may not turn. If at any time it is desirable to remove the nut, the operator has merely to detach one end of the wire from its prong, whereupon the nut may be removed or may be tightened and the holding-wire returned to position.

I claim as my invention—

A nut-lock consisting of a perforated washer having a pair of opposed prongs raised from the plane of the washer, and a bridge-wire adapted to be extended diametrically across the washer between the bases of the prongs, said prongs being at such distances from the center of the washer that, when the bridge-wire is removed, the nut, upon a bolt capable of passing through the perforation, may be turned freely between the prongs.

In witness whereof I have hereunto set my hand and seal, at Indianapolis, Indiana, this 7th day of April, A. D. 1903.

JAMES G. WAGGONER. [L. S.]

Witnesses:
CHARLES H. HUBBARD,
ARTHUR M. HOOD.